A. E. IVESON & A. R. WILSON.
COOLING APPARATUS.
APPLICATION FILED FEB. 9, 1907.
916,319.
Patented Mar. 23, 1909.
5 SHEETS—SHEET 2.
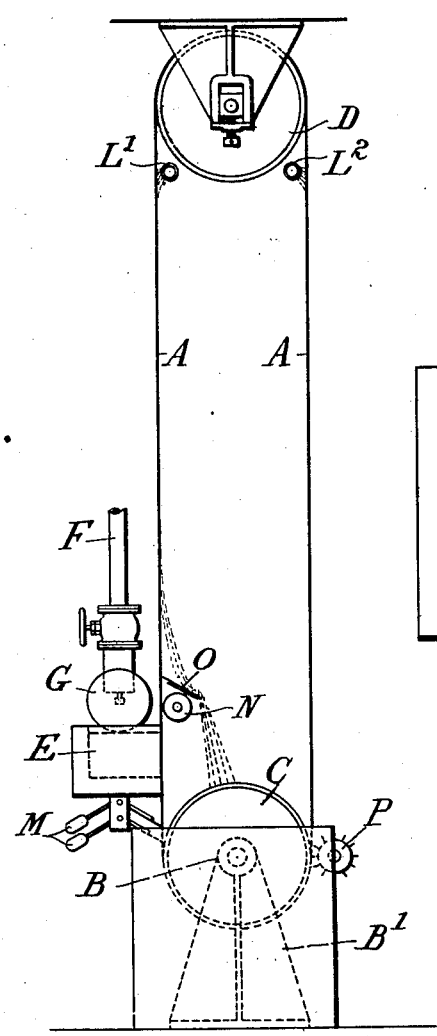
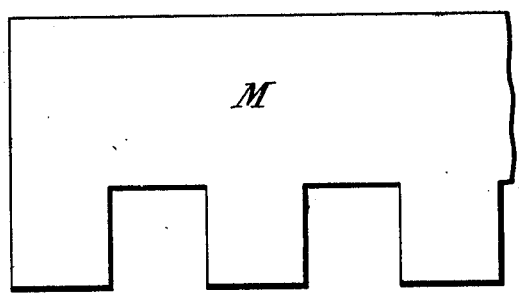
Witnesses.
Inventors
A. E. Iveson &
A. R. Wilson,
by Wilkinson & Fisher
Attorneys.

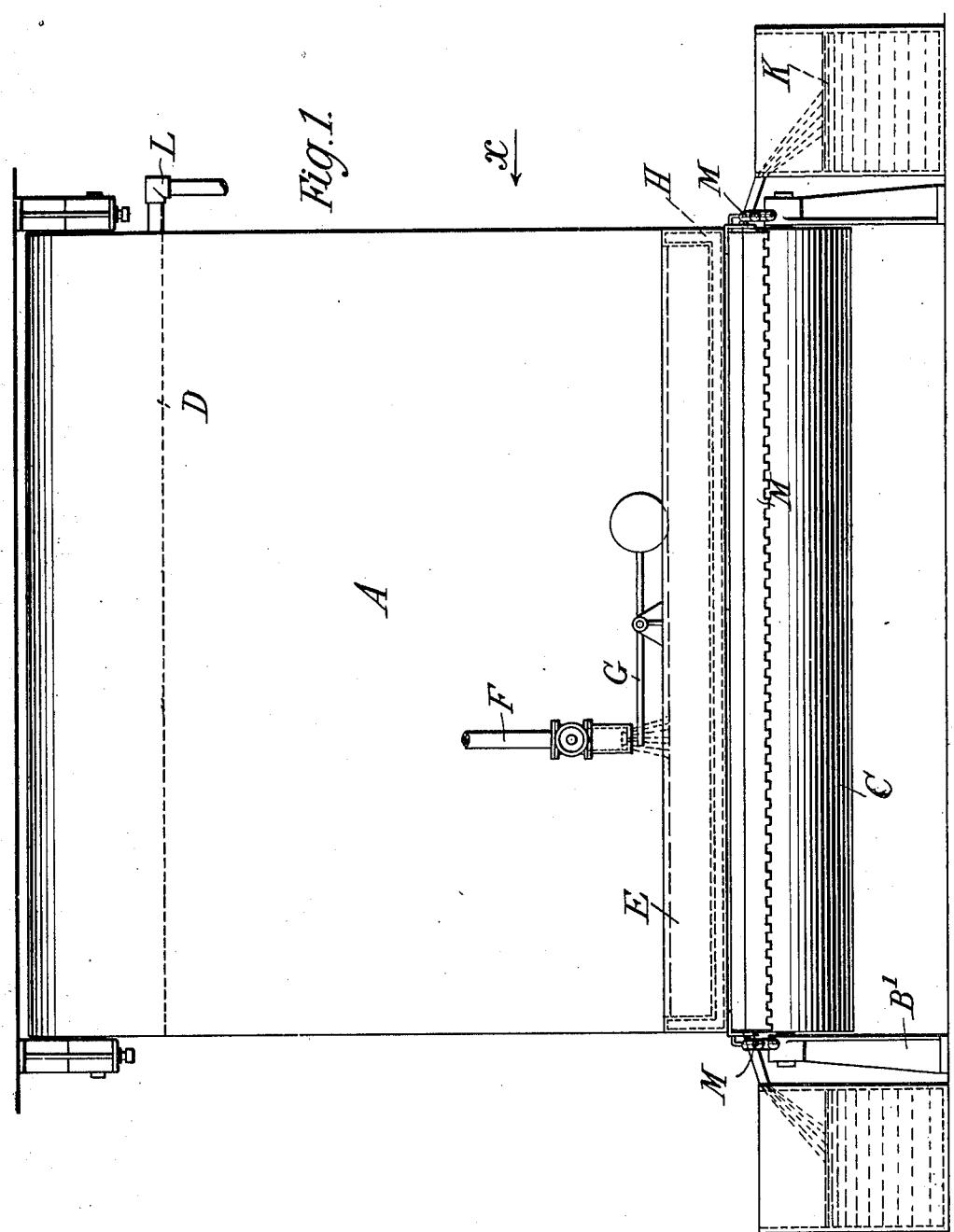

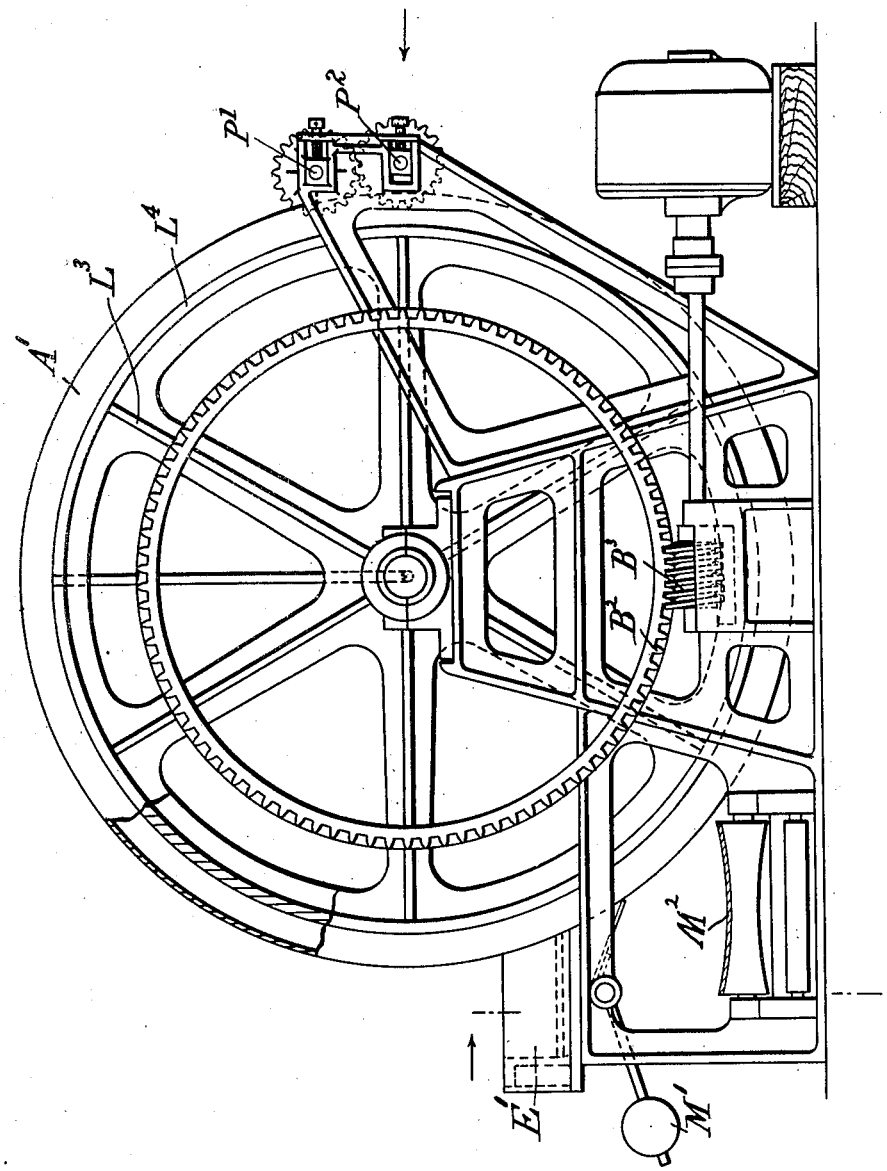

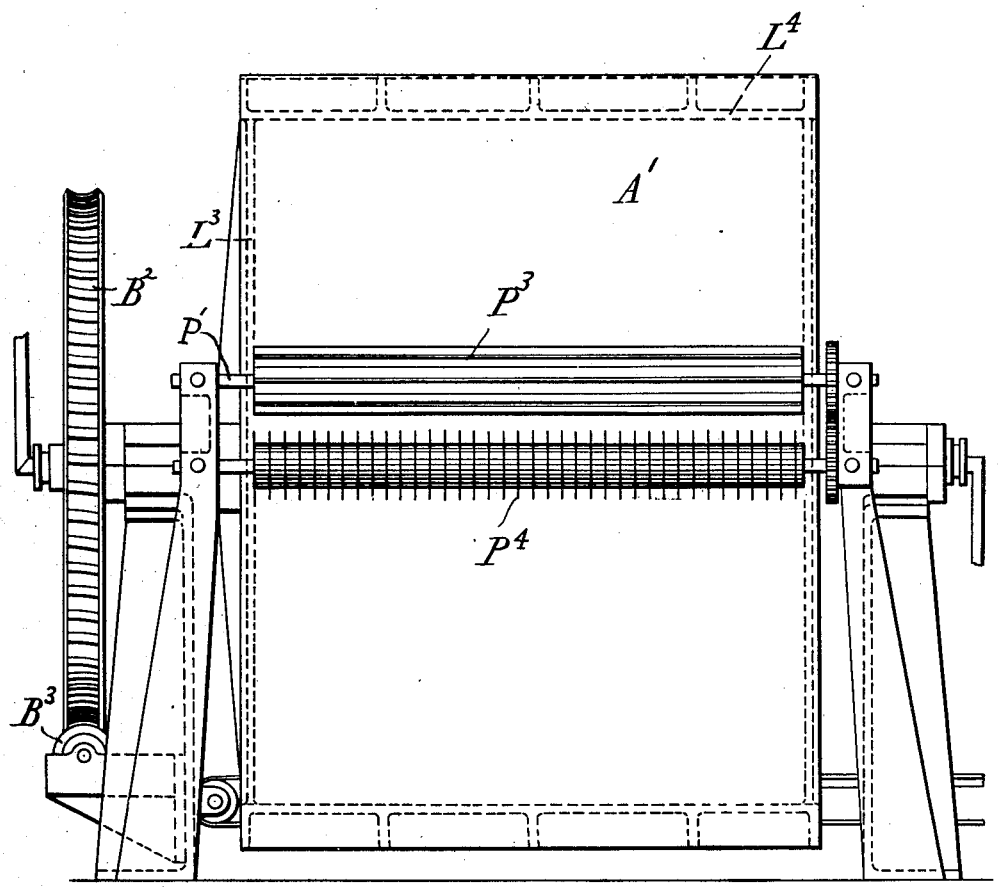

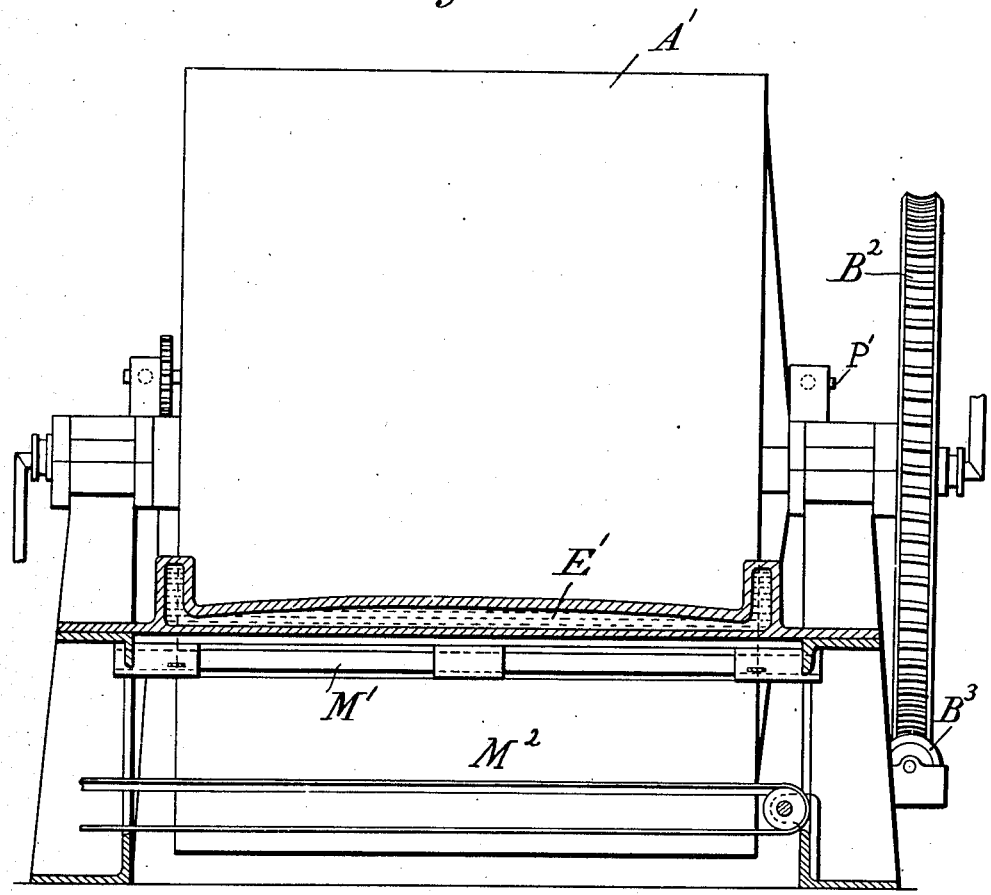

UNITED STATES PATENT OFFICE.

ALBERT ERNEST IVESON, OF GAINSBOROUGH, AND ARCHIBALD RALPH WILSON, OF BRIGHTON, ENGLAND.

COOLING APPARATUS.

No. 916,319.　　　　　Specification of Letters Patent.　　　Patented March 23, 1909.

Application filed February 9, 1907. Serial No. 356,658.

*To all whom it may concern:*

Be it known that we, ALBERT ERNEST IVESON, manufacturer, residing at "The Hollies," Gainsborough, in the county of Lincoln, England, and ARCHIBALD RALPH WILSON, chemist, residing at "Silverlea," Portland Villas, Hove, Brighton, in the county of Sussex, England, both subjects of the King of Great Britain, have invented certain new and useful Improvements in or Relating to Apparatus for Cooling Melted Fatty Substances, of which the following is a specification.

Our invention consists in an apparatus for cooling and collecting melted fatty substances by means of a moving cooled surface, upon which the substances are deposited in a layer, the deposition and removal of the layer taking place constantly. This invention is an improvement upon the former patent of A. R. Wilson assigned to A. E. Iveson, dated April 25, 1905, No. 788,446.

In carrying out our invention, we employ a tank for receiving fatty substances, in which one end or wall of the tank is formed by a moving surface, such as an endless carrier, or a drum or cylinder, means being used for cooling the interior of the carrier or cylinder and removing the layer of fatty substances deposited thereon. The tank is provided with means for heating the substances therein to keep them fluid, and means for keeping the substances in said tank at substantially a constant level.

With the objects stated in view, our invention consists in the construction and combinations of parts as hereinafter described and claimed.

In the accompanying drawings—Figure 1 represents an end view of one form of our apparatus. Fig. 2 represents a side view thereof. Fig. 3 is a top plan view of a part of one of the scraping knives. Fig. 4 is a side view of a modification in which a cylinder is used. Fig. 5 is a front view of the same, and Fig. 6 is a rear view of the same.

A represents an endless band or carrier, which passes around two rollers C and D, and forms one side of a reservoir or tank E, in which the fat to be cooled is placed.

F is a pipe for supplying melted fat to the tank E, the supply being governed by a float valve G, so that the level of the fat in the tank E is kept practically constant.

To prevent solidification, the fatty substances in the tank E are heated by the steam pipe H.

K represents a water tank, from which water may be pumped through the pipe L into the pipes L¹ and L², which are situated inside the endless carrier or band A near the top thereof, and are perforated to discharge jets of water on the inside of the endless carrier A, to cool said carrier. M represents weighted knives, held up against the surface of the carrier A, which is preferably made of sheet metal. These knives or scrapers have indented edges, as shown in Fig. 3, and are preferably arranged so that the teeth of the two knives will break joints, thus insuring that all the fat collected on the endless carrier A is scraped off.

N represents a roller located inside the endless carrier A, for keeping said carrier tightly pressed against the edges of the tank E, so that the liquid in said tank will not leak out around the edges of the carrier, and O is a shield or screen located over the roller N, so that the water from the pipe L¹ will be deflected away from the tank so that it will not cool the fat in said tank.

P is a roller fitted with longitudinal knives so arranged as to cut the fat deposited on the endless carrier A into sections of any desired size, so that the fat may be easily scraped from the carrier A. The endless carrier A is moved by any suitable means, such as a belt, not shown, passing over the pulley B on the shaft of the roller C, said shaft being supported in brackets B¹, the shaft of the pulley D being similarly supported in overhead brackets.

In the modification shown in Figs. 4, 5 and 6, instead of the endless carrier A, a revolving cylinder is used, preferably made of metal. In this modification, A¹ represents a cylinder, and E¹ the tank for holding the fat, said tank having one of its sides cut away in a curve, so as to exactly fit against the periphery of the cylinder A¹. This cylinder is revolved by means of a worm B³, engaging a circular rack B² on the shaft of the cylinder. L³ and L⁴ represent pipes for delivering water to the cylinder to cool its outside. P¹ and P² represent axles upon which knives P³ and P⁴ are carried, which serve to cut up the fat deposited on the surface of the cylinder A¹ into squares, the knives P³ running longitudinally of the cylinder A¹, and the knives P⁴ running transversely to said cylinder, the result being that the fat is cut up into a series of small squares on the surface of the cylinder, from whence it can be easily removed by means of the weighted knife or scraper M¹, which delivers the material scraped from the cylinder upon the concave, endless traveling belt M².

The operation is evident from the foregoing description.

We claim—

1. An apparatus for cooling melted fatty substances, comprising a tank, means for heating the contents of said tank, means for maintaining the material under treatment at a constant level in said tank, a movable collecting medium, forming one of the walls of said tank, means for cooling said medium, means for subdividing the material collected on said medium, and means for removing said collected material from said medium, substantially as described.

2. An apparatus for cooling melted fatty substances, consisting of a tank, a traveling endless belt forming one wall of said tank, means located inside of said belt for cooling the same, devices for preventing the cooling medium from striking that part of the belt which is adjacent to the tank, and means for removing from said belt the material collected thereon, substantially as described.

3. An apparatus for cooling melted fatty substances, comprising a tank, means for heating the contents of said tank, means for maintaining the liquid at a constant level in said tank, a traveling endless belt forming one of the walls of said tank, means located inside of said belt for cooling the same, devices for preventing the cooling medium from striking that part of the belt which is adjacent to said tank, and means for removing from said belt the material collected thereon, substantially as described.

In witness whereof we have hereunto set our hands in presence of two witnesses.

ALBERT ERNEST IVESON.
ARCHIBALD RALPH WILSON.

Witnesses:
H. D. JAMESON,
F. L. RAND.